July 19, 1949.　　　　　A. GRAHAM　　　　　2,476,858
GAUGE HOLDER
Filed May 9, 1947
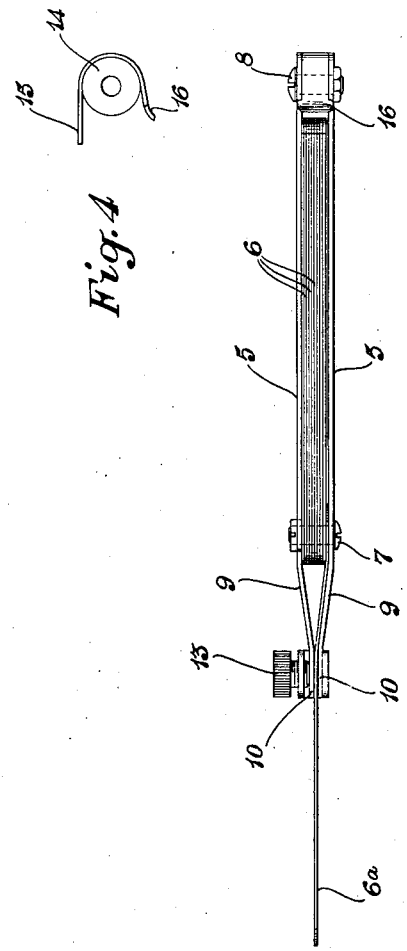
Inventor
Albert Graham
By Freas and Bishop
Attorneys Patented July 19, 1949

2,476,858

UNITED STATES PATENT OFFICE 2,476,858

GAUGE HOLDER

Albert Graham, Canton, Ohio

Application May 9, 1947, Serial No. 747,030

3 Claims. (Cl. 33—168)

The invention relates generally to holders for a set of tools, and more particularly to a novel holder for a set of flat feeler gauges. Prior holders for a set of flat gauges have included side plates normally covering the gauges which are pivoted at one end in the side plates, so that any of the gauges may separately be swung about the pivot to operative position. However, in using the gauges in such work as adjusting automotive valves, it is difficult and awkward to hold a desired gauge in operative position. It has been proposed to provide means on the holder for engaging one edge of the extended gauge, but such means is unsatisfactory because it prevents movement of the gauge in only one direction.

Another disadvantage of such prior gauge holders is that it is difficult to swing the gauges out from the side plates, and although a finger notch is sometimes provided in one or both side plates, such notch is not very helpful if the gauges are held in the side plates tightly enough to prevent their accidental dislodgment, or if the operator's fingers are oily.

Accordingly, it is an object of the present invention to provide a novel gauge holder which overcomes the disadvantages of prior constructions.

More specifically, it is an object of the present invention to provide a novel gauge holder having means for tightly clamping any of the gauges separately in operative position.

Another object is to provide a gauge holder having novel means for starting the gauges to swing out from the side plates.

A further object is to provide a simple, compact and inexpensive gauge holder which is easily operated for gripping any of a set of gauges separately in operative position.

These and other objects are accomplished by the parts, constructions and arrangements comprising the present invention, a preferred embodiment of which is shown by way of example in the accompanying drawing and described in detail in the following specification, and which is set forth and defined in the claims forming part hereof.

In general terms, the invention may be described as a gauge holder having a plurality of superimposed gauges pivoted at one end within a pair of side plates, said side plates being extended beyond the pivoted ends and tapered toward each other, a screw clamp being provided on the side plate extensions for tightly clamping any of the gauges between the ends of the extensions, and there being a finger member swiveled in the opposite ends of the side plates for initiating swinging movement of all of the gauges out from the holder.

Referring to the drawing forming part hereof, in which a preferred embodiment of the invention is shown by way of example, Figure 1 is a top plan view of the improved gauge holder with one of the gauges clamped in operating position, and the other gauges started to swing out from the holder;

Fig. 2 is a side elevation thereof;

Fig. 3 is an enlarged transverse sectional view, as on line 3—3, Fig. 1; and

Fig. 4 is a detached plan view of the finger member for initiating the swinging movement of the gauges from the holder.

Similar numerals refer to similar parts throughout the several views of the drawing.

While the novel gauge holder is shown and described as applied to a set of flat feeler gauges, it is apparent that the invention may be embodied in a holder for other gauges or tools, as for example, in a set of screw driver blades, without departing from the scope of invention as defined in the claims.

The improved holder preferably includes a pair of longitudinal side plates 5 which are mounted in spaced parallel relation and are adapted to enclose a set of flat feeler gauges 6. The feeler gauges 6 are of usual construction and are preferably all the same length and width for being superimposed upon each other within the side plates 5. As shown, the side plates 5 are substantially the same width or slightly wider than the feeler gauges 6.

At one end the feeler gauges 6 are pivotally mounted in the side plates 5 by a rivet or bolt 7, so that any of the gauges may be swung through substantially 180° to operative position such as occupied by the gauge 6a in Figs. 1 and 2.

Adjacent the free ends of the gauges 6 when folded within the side plates, the side plates are secured together by means of a rivet or bolt 8 which serves to aid in holding the set of gauges relatively tightly within the side plates 5 when not in use. The parts thus far described comprise a conventional form of feeler gauge, and per se form no part of the present invention.

In the present invention the side plates 5 are provided with extensions or projections 9 extending longitudinally beyond the pivot 7 and ends of the gauges 6 adjacent thereto, and as shown in Fig. 2, these extensions are offset or tapered toward each other so that their outer end portions 10 are closely adjacent each other. As shown, the projections 9 preferably are extensions of the side plates 5, although they could within the scope of the invention be separate projections attached thereto.

A novel screw clamp is preferably provided at the ends 10 of the extensions for tightly gripping any one of the gauges 6 in operative position therebetween. As shown in Figs. 2 and 3, the bottom gauge 6a is shown in this position. Preferably, the improved clamping means includes a U-shaped clamp piece 11 secured to one of the extensions 9 as by rivets 12 and extending around one side of the extensions and over the top thereof. A thumb screw 13 is threaded through the top portion of the clamp 11 for squeezing the ends 10 of the extensions together and tightly clamping the gauge 6a therebetween. The gauges are thin and flexible enough so that they will bend sufficiently when clamped to position the outwardly projecting portion of the gauge in a plane substantially parallel with the side plates of the holder. In this position, the gauge 6a or any of the other gauges is held in conveniently operative position, and the clamping screw 13 can easily be tightened to grip the gauge in its operative position so that it will not swing to right or left on the pivot 7.

In order to initiate the swinging movement of the gauges 6 out from the side plates of the holder, a novel finger piece is provided adjacent to the free ends of the gauges. This finger piece preferably includes an annular portion 14 rotatably mounted on the bolt 8, and having a projection 15 for engaging the free ends of the gauges at one side thereof. On the opposite side of the annular portion 14 is an outwardly curved projection 16 which is adapted to be engaged by the thumb or finger for forcing the projection 15 against the gauges to initiate their swing. Thus the finger piece provides for starting all of the gauges to swing about their pivot 7, as indicated in Fig. 1, even though the gauges are tightly held between the side plates by the bolts 7 and 8.

The novel gauge holder is simple and inexpensive to manufacture, easy and convenient to use, and overcomes the disadvantages of prior gauge holders, in that the gauges are easily started swinging toward operative position, and any desired gauge is quickly and tightly clamped in operative position during use.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions and reasonable mechanical equivalents thereof obvious to those skilled in the art, are set forth in the appended claims.

I claim:

1. A gauge holder including a pair of side plates, a plurality of superimposed gauges pivoted at one end between said side plates, said side plates being extended beyond the pivoted ends of the gauges and being offset toward each other, and a screw clamp at the outer end of one of said extensions for tightly gripping any of the gauges in outwardly swung position between said extensions.

2. A gauge holder including a pair of side plates, a plurality of superimposed gauges pivoted at one end between said side plates, said side plates being extended beyond the pivoted ends of the gauges and being offset toward each other, a U-shaped clamp on one of said extensions and surrounding the other extension, and a clamping screw mounted in said clamp for tightly gripping any of the gauges in outwardly swung position between said extensions.

3. A gauge holder including a pair of side plates, a plurality of superimposed gauges located between said side plates and pivoted at one end thereto, longitudinal projections on the side plates extending away from said pivoted ends and tapering toward each other at their outer ends, and screw clamping means mounted on the outer ends of said projections for clamping them together and tightly gripping any of said gauges in outwardly swung position therebetween.

ALBERT GRAHAM.

REFERENCES CITED

The following references are of record in the file of this patent:

UNITED STATES PATENTS

| Number | Name | Date |
|---|---|---|
| 1,661,701 | Michler | Mar. 6, 1928 |
| 1,706,251 | Perry | Mar. 19, 1929 |
| 1,744,856 | Amsden | Jan. 28, 1930 |
| 1,875,784 | Walker | Sept. 6, 1932 |

FOREIGN PATENTS

| Number | Country | Date |
|---|---|---|
| 10,067 | Great Britain | Apr. 22, 1897 |